W. E. CONNIFF.
REINFORCED PLASTER BODY.
APPLICATION FILED NOV. 15, 1915.

1,268,929.

Patented June 11, 1918.

Witness
R. E. Hamilton

Inventor
William E. Conniff
By Warren D. House
His Attorney

UNITED STATES PATENT OFFICE.

WILLIAM E. CONNIFF, OF KANSAS CITY, MISSOURI, ASSIGNOR OF ONE-HALF TO EDWARD J. CUTTING, OF KANSAS CITY, MISSOURI.

REINFORCED-PLASTER BODY.

1,268,929.

Specification of Letters Patent.   Patented June 11, 1918.

Application filed November 15, 1915. Serial No. 61,525.

*To all whom it may concern:*

Be it known that I, WILLIAM E. CONNIFF, a citizen of the United States, residing at Kansas City, in the county of Jackson and State of Missouri, have invented a certain new and useful Improvement in Reinforced-Plaster Bodies, of which the following is a specification.

My invention relates to improvements in reinforced plaster bodies.

The object of my invention is to provide a molded body having a reinforcing metallic element embedded therein, which is adapted for structural purposes, such as for use in beams, joists, etc., and which is adapted to firmly hold nails, spikes, bolts or screws which may be driven therein.

For effecting this object, I provide a body composed of cementitious material, such as plaster, which is mixed with fibrous material, such as wood fiber, this mixture being molded to the shape required for the particular purpose in view and then permitted to harden, reinforcing material, such as expanded metal, being embedded in the mixture.

In the accompanying drawing, which is illustrative of my invention,

Similar reference characters designate similar parts in the different views.

Figure 1:
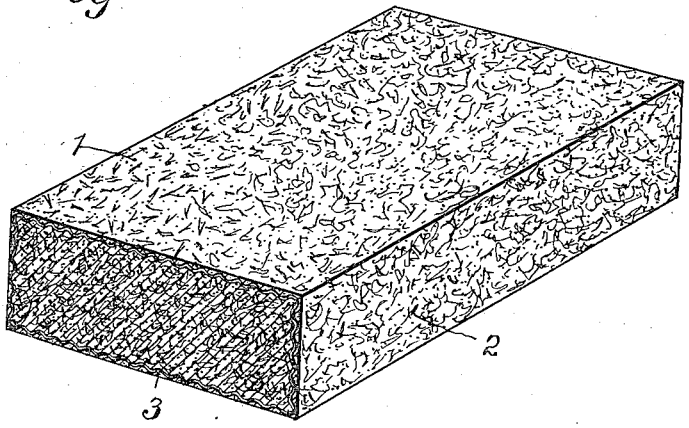
Figure 1 is a perspective view of a body embodying my invention.

Cementitious material 1, preferably comprising plaster mixed with yielding fibrous material 2, such as wood fiber, is placed in a plastic condition in a mold of suitable form and containing metallic reinforcing material 3, preferably expanded metal, or some other perforate metallic material, and then permitted to dry and harden.

The reinforcing metal greatly strengthens the body, and the presence in the body of the yielding fibrous material imparts to the body the quality of adhering to and firmly holding a nail 4, or such other device, such as a screw or bolt, which may be driven therein.

It is well known that nails driven into ordinary plaster or cement will effect a crumbling of the material which will not permit of the nails being firmly held. By employing a yielding fibrous material, such as wood fiber, mixed with the plaster, nails or other like devices when driven into a body composed of such materials, will be firmly held and engaged by the yielding fibrous material. For this reason, structural bodies embodying my invention are well adapted for employment as supports for boards or laths which are nailed thereto. Bodies constructed in accordance with my invention are, therefore, well adapted for use as joists, studding, rafters etc.

As is shown in the drawing, the reinforcing material 3 is embedded flush with the surface of the body and wholly embraces the sides and edges thereof. By having the reinforcing material embedded at the surface, when a nail or a spike is driven into the body, the latter will not be cracked and have large chunks broken out, as would occur if the reinforcing material were embedded at a substantial distance from the surface of the body. Thus with my improved construction, nails driven into the body will be securely nailed therein and will not break chunks out of the surface thereof.

Figure 2:
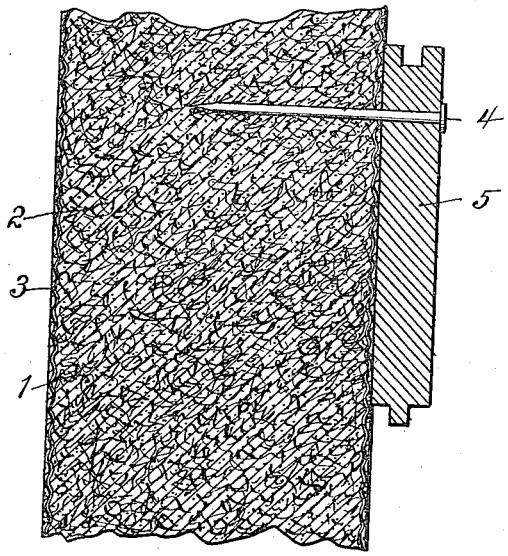
Fig. 2 is a vertical sectional view of a body made in accordance with my improvement, and a board shown nailed to the body.

In Fig. 2, I have shown a board 5 fastened by a nail 4 to a body embodying my invention.

Modifications of my invention, within the scope of the appended claims, may be made without departing from its spirit.

What I claim is:—

1. A body composed of plaster mixed with wood fiber, and perforate reinforcing material embracing the sides and edges of the body and embedded therein flush with the surface thereof.

2. A body composed of cementitious material mixed with yielding fibrous material, and perforate reinforcing material embedded therein flush with the surface thereof.

In testimony whereof I have signed my name to this specification.

WILLIAM E. CONNIFF.